United States Patent
Thomas et al.

(10) Patent No.: US 11,274,884 B2
(45) Date of Patent: Mar. 15, 2022

(54) HEAT EXCHANGER MODULE WITH AN ADAPTER MODULE FOR DIRECT MOUNTING TO A VEHICLE COMPONENT

(71) Applicant: Dana Canada Corporation, Oakville (CA)

(72) Inventors: Biju Thomas, Sterling Heights, MI (US); Jason C. Eramo, Clinton Township, MI (US); Benjamin A. Kenney, Toronto (CA)

(73) Assignee: Dana Canada Corporation, Oakville (CA)

( * ) Notice: Subject to any disclaimer, the term of this patent is extended or adjusted under 35 U.S.C. 154(b) by 99 days.

(21) Appl. No.: 16/830,231

(22) Filed: Mar. 25, 2020

(65) Prior Publication Data

US 2020/0309472 A1 Oct. 1, 2020

Related U.S. Application Data

(60) Provisional application No. 62/826,334, filed on Mar. 29, 2019.

(51) Int. Cl.
*F28F 9/007* (2006.01)
*F28F 9/00* (2006.01)
(Continued)

(52) U.S. Cl.
CPC ............ *F28F 9/0075* (2013.01); *F28F 3/083* (2013.01); *F28F 9/002* (2013.01); *F28F 9/005* (2013.01); *F28F 9/262* (2013.01); *F16H 57/0417* (2013.01)

(58) Field of Classification Search
CPC .......... F28F 3/086; F28F 9/002; F28F 9/0075; F28F 9/0278; F28F 27/02; F28F 2250/06;
(Continued)

(56) References Cited

U.S. PATENT DOCUMENTS

| 1,907,036 A | 5/1933 | Belleau |
| 2,045,657 A | 6/1936 | Karmazin |

(Continued)

FOREIGN PATENT DOCUMENTS

| CN | 200989226 Y | 12/2007 |
| DE | 20010816 U1 | 11/2001 |

(Continued)

OTHER PUBLICATIONS

Four Drawings of a Heat Exchanger Module on One Sheet Apr. 11, 2011.

(Continued)

*Primary Examiner* — Paul Alvare
*Assistant Examiner* — Jose O Class-Quinones
(74) *Attorney, Agent, or Firm* — Ridout & Maybee LLP

(57) ABSTRACT

A heat exchanger module adapted for being mounted directly to the outer surface of the housing of an automobile system component, such as a transmission or engine housing, is provided. The heat exchanger module has a heat exchanger fixedly attached to an adapter module. The adapter module contains one of more fluid transfer channels and includes a portion that extends outwardly beyond the footprint of the heat exchanger. The adapter module is comprised of a first embossed plate that is sealed with a second plate, which may also be embossed. The embossments provide fluid transfer channels and also perform as structural ribs to enhance the rigidity of the adapter module.

19 Claims, 7 Drawing Sheets

(51) Int. Cl.
*F28F 3/08* (2006.01)
*F28F 9/26* (2006.01)
*F16H 57/04* (2010.01)

(58) Field of Classification Search
CPC ... F28F 2250/10; F28F 2280/06; F28D 9/005;
F28D 9/0075; F28D 9/0081; F28D
2021/0089; F16H 57/0417; F16H
57/0423; F16H 57/0413; F01M 5/001;
B60K 11/02
See application file for complete search history.

(56) References Cited

U.S. PATENT DOCUMENTS

| | | | |
|---|---|---|---|
| 4,423,708 A * | 1/1984 | Sweetland | F01P 11/08 |
| | | | 123/196 AB |
| 4,708,199 A | 11/1987 | Yogo et al. | |
| 5,176,206 A | 1/1993 | Nagasaka et al. | |
| 5,529,120 A | 6/1996 | Howard et al. | |
| 5,810,071 A | 9/1998 | Pavlin | |
| 5,826,648 A | 10/1998 | Shimoya et al. | |
| 5,896,834 A | 4/1999 | Gruner | |
| 5,896,835 A * | 4/1999 | Kato | F28D 9/005 |
| | | | 123/73 A |
| 5,927,394 A | 7/1999 | Mendler et al. | |
| 5,964,281 A | 10/1999 | Voss et al. | |
| 5,964,283 A | 10/1999 | Pavlin | |
| 6,161,615 A | 12/2000 | Brieden et al. | |
| 6,182,746 B1 | 2/2001 | Wiese | |
| 6,199,626 B1 | 3/2001 | Wu et al. | |
| 6,224,334 B1 | 5/2001 | Siga et al. | |
| 6,263,962 B1 | 7/2001 | Komoda et al. | |
| 6,340,053 B1 | 1/2002 | Wu et al. | |
| 6,827,139 B2 * | 12/2004 | Kawakubo | F28D 1/0476 |
| | | | 165/173 |
| 6,843,311 B2 | 1/2005 | Evans et al. | |
| 7,377,308 B2 | 5/2008 | Ware | |
| 7,533,717 B2 * | 5/2009 | Hummel | F28D 9/005 |
| | | | 165/167 |
| 7,607,473 B2 * | 10/2009 | Ichiyanagi | F28D 1/0391 |
| | | | 165/173 |
| 7,717,164 B2 | 5/2010 | Richter | |
| 7,735,520 B2 * | 6/2010 | Peric | F28D 9/005 |
| | | | 137/855 |
| 7,748,442 B2 * | 7/2010 | Kalbacher | F16H 57/0412 |
| | | | 165/299 |
| 7,775,067 B2 | 8/2010 | Ichiyanagi | |
| 8,186,328 B2 * | 5/2012 | Kiemlen | F01M 5/002 |
| | | | 123/196 AB |
| 9,109,840 B2 * | 8/2015 | Kadle | F25B 30/02 |
| 9,528,773 B2 * | 12/2016 | Otahal | F28D 9/005 |
| 9,863,715 B2 * | 1/2018 | Gruener | F28F 3/08 |
| 9,885,432 B2 | 2/2018 | Lemee et al. | |
| 9,933,215 B2 | 4/2018 | Ollier | |
| 9,951,998 B2 * | 4/2018 | Bardeleben | F28F 9/0253 |
| 10,222,138 B2 | 3/2019 | Ollier | |
| 2003/0134233 A1 | 7/2003 | Su et al. | |
| 2003/0188857 A1 * | 10/2003 | Kawakubo | F28F 9/0243 |
| | | | 165/174 |
| 2005/0217830 A1 | 10/2005 | Matsubara et al. | |
| 2006/0096556 A1 * | 5/2006 | Groddeck | F28F 9/0221 |
| | | | 123/41.33 |
| 2006/0118283 A1 | 6/2006 | Hanafusa | |
| 2006/0237184 A1 | 10/2006 | Peric | |
| 2007/0062681 A1 * | 3/2007 | Beech | F28F 9/0246 |
| | | | 165/170 |
| 2007/0084809 A1 | 4/2007 | Bradu | |
| 2007/0158057 A1 | 7/2007 | Higashiyama | |
| 2008/0066895 A1 * | 3/2008 | Wegner | F28D 9/005 |
| | | | 165/167 |
| 2008/0110605 A1 | 5/2008 | Richter | |
| 2008/0257536 A1 | 10/2008 | Kolblin et al. | |
| 2009/0032231 A1 | 2/2009 | Komoda et al. | |
| 2010/0044015 A1 | 2/2010 | Capriz et al. | |
| 2010/0071639 A1 * | 3/2010 | Wegner | F02M 26/32 |
| | | | 123/41.08 |
| 2010/0089342 A1 * | 4/2010 | Wegner | F02B 29/0462 |
| | | | 123/41.08 |
| 2010/0206516 A1 | 8/2010 | Muller-Lufft et al. | |
| 2011/0024095 A1 | 2/2011 | Kozdras et al. | |
| 2011/0120678 A1 * | 5/2011 | Palm | F28D 9/0075 |
| | | | 165/109.1 |
| 2012/0061060 A1 | 3/2012 | Stoll et al. | |
| 2012/0205085 A1 | 8/2012 | Ariyama | |
| 2012/0247145 A1 * | 10/2012 | Denoual | F28F 9/001 |
| | | | 62/498 |
| 2013/0133874 A1 * | 5/2013 | Kim | F01P 7/165 |
| | | | 165/296 |
| 2013/0133875 A1 * | 5/2013 | Kim | F28D 9/0093 |
| | | | 165/296 |
| 2013/0319634 A1 * | 12/2013 | Sheppard | F28F 27/00 |
| | | | 165/96 |
| 2014/0020866 A1 | 1/2014 | Bluetling et al. | |
| 2014/0096935 A1 * | 4/2014 | Cho | F28D 9/005 |
| | | | 165/104.13 |
| 2014/0262176 A1 * | 9/2014 | Min | F28D 9/02 |
| | | | 165/166 |
| 2014/0352935 A1 * | 12/2014 | Gruener | F28D 9/005 |
| | | | 165/166 |
| 2015/0300743 A1 * | 10/2015 | Persson | F28F 3/086 |
| | | | 165/166 |
| 2015/0315940 A1 * | 11/2015 | Sarder | F01P 1/06 |
| | | | 123/41.33 |
| 2016/0187067 A1 * | 6/2016 | Kobayashi | F28D 9/005 |
| | | | 165/166 |
| 2016/0245597 A1 | 8/2016 | Meshenky et al. | |
| 2017/0184347 A1 * | 6/2017 | Ariyama | F28D 9/005 |
| 2017/0227302 A1 * | 8/2017 | Draenkow | B60R 16/08 |
| 2017/0328644 A1 * | 11/2017 | Takahashi | F28F 9/22 |
| 2017/0370651 A1 * | 12/2017 | Somhorst | F28F 9/02 |
| 2018/0128555 A1 * | 5/2018 | Kinder | F28F 9/0075 |
| 2018/0337434 A1 * | 11/2018 | Burgers | H01M 10/613 |
| 2019/0154364 A1 | 5/2019 | Ollier | |

FOREIGN PATENT DOCUMENTS

| | | | | |
|---|---|---|---|---|
| DE | 102007030563 A1 | 1/2009 | | |
| EP | 0623798 A2 | 11/1994 | | |
| EP | 1876406 A1 | 1/2008 | | |
| JP | 11236811 | 8/1999 | | |
| JP | 2011140915 | 7/2011 | | |
| WO | WO-2012061928 A1 * | 5/2012 | | F28F 9/0075 |
| WO | WO-2017214478 A1 * | 12/2017 | | F28D 9/005 |
| WO | WO-2018035614 A1 * | 3/2018 | | F28F 9/0256 |
| WO | 2019102376 A1 | 5/2019 | | |

OTHER PUBLICATIONS

English Machine Translation of CN 200989226Y Dec. 12, 2007.
English Machine Translation of DE 20010816 U1 Nov. 15, 2001.
English Machine Translation of DE 102007030563 A1 Jan. 2, 2009.
English Machine Translation of EP 0623798 A2 Nov. 9, 1994.
English Machine Translation of EP 1876406 A1 Jan. 9, 2008.
English Machine Translation of JP 11236811 Aug. 31, 1999.
English Machine Translation of JP 2011140915 Jul. 21, 2011.

* cited by examiner

HEAT EXCHANGER MODULE WITH AN ADAPTER MODULE FOR DIRECT MOUNTING TO A VEHICLE COMPONENT

CROSS-REFERENCE TO RELATED APPLICATION

This application claims priority to and the benefit of U.S. Provisional Patent Application No. 62/826,334 filed Mar. 29, 2019, the contents of which are incorporated herein by reference.

TECHNICAL FIELD

The present disclosure relates to heat exchangers, and in particular, to heat exchangers adapted for direct mounting to the housing of an automobile system component.

BACKGROUND

Plate-type heat exchangers comprising a plurality of stacked heat exchanger plates are known for a variety of purposes, including heat exchange between transmission oil or engine oil and an engine coolant in a motor vehicle having an internal combustion engine. A known way of mounting a stacked plate heat exchanger is to mount a planar base plate at one end of the stack, for example, the bottom end. The base plate can be brazed to the heat exchanger with or without the use of a shim plate, and is typically thicker than the plates comprising the heat exchanger. In order to incorporate the heat exchanger into the vehicle's cooling system, for example, the heat exchanger with base plate is then, typically, mechanically mounted to a cast or moulded adapter structure which in turn is mounted to the transmission or engine housing, for example, using additional fluid lines and/or connectors. The cast or moulded adapter structure includes mounting holes, fluid transfer channels, fluid fittings, filters, etc. to allow the heat exchanger to be incorporated into the overall heat exchange system. In some instances the cast or moulded adapter structure is made of plastic and in other instances it is a more heavy-duty casting that can be quite complex in structure and costly. In both instances, the adapter structure contributes to the overall height and weight of the heat exchanger component as well as to the overall manufacturing costs.

In the field of automotive heat exchanger manufacture, weight limitations as well as space limitations are becoming increasingly restrictive. Accordingly, efforts are constantly being made to reduce component weight as well as component height and/or size. Efforts are also being made to reduce the complexity and increase the adaptability and/or flexibility of components to facilitate assembly and mounting of the component within the overall system and in an effort to reduce overall manufacturing and/or assembly costs. For instance, reducing the overall number of components or component interfaces that result from mounting or integrating a component within an overall system reduces the number of potential leakage points thereby reducing testing requirements as well as assembly steps. Reducing the complexity of components and reducing the number of more complex fluid connections between components also serves to reduce costs and is, therefore, desirable.

Accordingly, there is a need for a heat exchanger with an improved mounting arrangement which allows for the direct mounting of the heat exchanger to the housing of an automobile system component.

SUMMARY OF THE INVENTION

In accordance with an aspect of the present disclosure, there is provided a heat exchanger module for mounting directly to the outer surface of a housing of an automobile system component. The heat exchanger module comprises a heat exchanger and an adapter module.

According to an aspect, the heat exchanger comprises a plurality of stacked heat exchange plates defining alternating first and second fluid flow passages through the heat exchanger, the heat exchanger having a footprint corresponding to an area defined by the stack of heat exchange plates.

According to an aspect, the heat exchanger comprises a pair of first fluid manifolds extending through the heat exchanger and coupled to one another by the first fluid flow passages, the pair of first fluid manifolds comprising an inlet manifold and an outlet manifold for the flow of a first fluid through the heat exchanger; and a pair of second fluid manifolds extending through the heat exchanger and coupled to one another by the second fluid flow passages, the pair of second fluid manifolds comprising an inlet manifold and an outlet manifold for the flow of a second fluid through the heat exchanger.

According to an aspect, the adapter module has a first surface and an opposite second surface, wherein the first surface of the adapter module is attached to an end of the heat exchanger within the footprint of the heat exchanger, and the second surface is adapted for direct face-to-face contact with an interface surface on the outer surface of the automobile system component housing, and the adapter module has a length and a width and includes a portion that extends outwardly beyond the footprint of the heat exchanger.

According to an aspect, the adapter module comprises a second fluid inlet port on the second surface of the adapter module and outside the footprint of the heat exchanger, the second fluid inlet port being adapted for receiving the second fluid from an outlet port of the automobile system component housing; and a second fluid outlet port on the second surface of the adapter module and outside the footprint of the heat exchanger, the second fluid outlet port being adapted for discharging the second fluid to an inlet port of the automobile system component housing.

According to an aspect, the adapter module comprises a first fluid transfer channel formed in the adapter module for allowing fluid communication between a first one of the second fluid manifolds and the second fluid inlet port or the second fluid outlet port.

According to an aspect, the adapter module comprises a first adapter plate having a first surface and an opposed second surface, the first surface of the first adapter plate defining the first surface of the adapter module, and through which the adapter module is attached to the end of the heat exchanger; and a second adapter plate having a first surface and a second surface, the first surface of the second adapter plate fixedly attached to the second surface of the first adapter plate, and the second surface of the second adapter plate defining the second surface of the adapter module.

According to an aspect, the first fluid transfer channel is formed between the first and second adapter plates, and comprises a first trough portion which projects from the second surface of the second adapter plate.

According to an aspect, the first trough portion is elongate, and extends along at least a portion of the length of the adapter module and/or along at least a portion of the width of the adapter module.

According to an aspect, the first trough portion has a first end and a second end, the first trough portion extending continuously between the first and second ends thereof, the first end being within the footprint of the heat exchanger and aligned with a first fluid port formed on the first adapter plate, the first fluid port being aligned with the one second fluid manifold, and wherein the second end of the first trough portion is outside the footprint of the heat exchanger and aligned with the second fluid inlet or outlet port.

According to an aspect, the first trough portion comprises an embossed rib and is integral with the second adapter plate.

According to an aspect, the plurality of stacked heat exchange plates comprises a plurality of core plates, a top plate, and a bottom plate, wherein the bottom plate has a bottom surface which defines the end of the heat exchanger to which the first surface of the adapter module is attached.

According to an aspect, the core plates are identical to one another, and wherein the bottom plate has at least the same shape and thickness as the core plates.

According to an aspect, the bottom plate and each of the core plates has four conduit openings, and wherein the bottom plate and the core plates are identical to each other.

According to an aspect, the heat exchanger module further comprises a second fluid transfer channel formed in the adapter module for allowing fluid communication between a second one of the second fluid manifolds and the other one of the second fluid inlet port and the second fluid outlet port; wherein the second fluid transfer channel is formed between the first and second adapter plates; wherein the second fluid transfer channel comprises a second trough portion which projects from the second surface of the second adapter plate; wherein the second trough portion comprising the second fluid transfer channel is elongate, and extends along at least a portion of the length of the adapter module and/or at least a portion of the width of the adapter module. The second trough portion comprises a second embossed rib and has a first end and a second end, the second trough portion extending continuously between the first and second ends thereof, the first end being within the footprint of the heat exchanger and aligned with a second fluid port formed on the first adapter plate, the second fluid port being aligned with another of the second fluid manifolds, and the second end being outside the footprint of the heat exchanger and aligned with the second fluid inlet or outlet port.

According to an aspect, the heat exchanger module further comprises a third trough portion formed in the second adapter plate, the third trough portion having a first end and a second end, the third trough portion extending continuously between the first and second ends thereof, the first end being within the footprint of the heat exchanger and aligned with a first fluid inlet port formed on the first adapter plate, and the second end being outside the footprint of the heat exchanger and aligned with the first fluid inlet manifold of the heat exchanger, wherein the third trough portion projects from the second surface of the second adapter plate, wherein the third trough portion extends along at least a portion of the length of the adapter module and/or at least a portion of the width of the adapter module, and wherein the third trough portion comprises a third embossed rib.

According to an aspect, the heat exchanger module further comprises a fourth trough portion formed in the second adapter plate, the fourth trough portion having a first end and a second end, the fourth trough portion extending continuously between the first and second ends thereof, the first end being within the footprint of the heat exchanger and aligned with a first fluid outlet port formed on the first adapter plate, and the second end being outside the footprint of the heat exchanger and aligned with the first fluid outlet manifold of the heat exchanger, wherein the fourth trough portion projects from the second surface of the second adapter plate, wherein the fourth trough portion extends along at least a portion of the length of the adapter module and/or at least a portion of the width of the adapter module, and wherein the fourth trough portion comprises a fourth embossed rib.

According to an aspect, the heat exchanger module further comprises a first projection formed on the first adapter plate, wherein the first projection is positioned over the second fluid inlet or outlet port.

According to an aspect, the first projection projects from the first surface of the first adapter plate, and is located in an area of the first adapter plate which is outside the footprint of the heat exchanger; wherein the first projection comprises an embossed rib.

According to an aspect, the first projection has a lachrymiform shape, with a spherically rounded head portion and a frustum tail portion; and the spherically rounded head portion of the first projection is positioned over an end of the first trough portion and over the second fluid inlet or outlet port, and the frustum tail portion of the first projection points in a direction toward an opposite end of the first trough portion.

According to an aspect, the first projection is positioned over the second fluid inlet port, wherein the first fluid transfer channel allows fluid communication between the first one of the second fluid manifolds and the second fluid inlet port; and the heat exchanger module further comprises a second projection formed on the first adapter plate, wherein the second projection is positioned over the second trough portion and the second fluid outlet port, wherein the second projection projects from the first surface of the first adapter plate, and is located in an area of the first adapter plate which is outside the footprint of the heat exchanger, and wherein the second projection comprises an embossed rib.

According to an aspect, the second projection has a lachrymiform shape, with a spherically rounded head portion and a frustum tail portion; and wherein the spherically rounded head portion of the second projection is positioned over an end of the second trough portion and over the second outlet port, and the frustum tail portion of the second projection points in a direction toward an opposite end of the first trough portion.

According to an aspect, an area of the first adapter plate which is positioned directly above the first trough portion and which partly defines the first fluid transfer channel is configured as an inverted arch.

According to an aspect, the inverted arch projects from the second surface of the first adapter plate and into the first fluid transfer channel.

According to an aspect, the heat exchanger module further comprises a plurality of openings formed on the perimeter of the adapter module; and a protective shield mounted onto the heat exchanger where a plurality of connection members of the protective shield engage the plurality of openings.

According to an aspect, each of the second fluid inlet port and the second fluid outlet port is provided with a plug-in fitting which is adapted to be sealingly received inside an inlet port or an outlet port of the automobile system component housing.

According to an aspect, the automobile system component is a transmission, the first fluid is engine coolant, and the second fluid is transmission oil.

According to an aspect, the first adapter plate further comprises third and fourth fluid ports, each of which is in fluid communication with a bottom end of one of the first fluid manifolds of the heat exchanger; and a slit opening in the first adapter plate, extending between the third and fourth fluid ports, such that fluid communication is provided between the third and fourth fluid ports through the slit opening.

According to an aspect, the slit opening defines a pressure relief channel for the first fluid, together with a bottom surface of a bottom plate of the heat exchanger, and the first surface of the second adapter plate.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
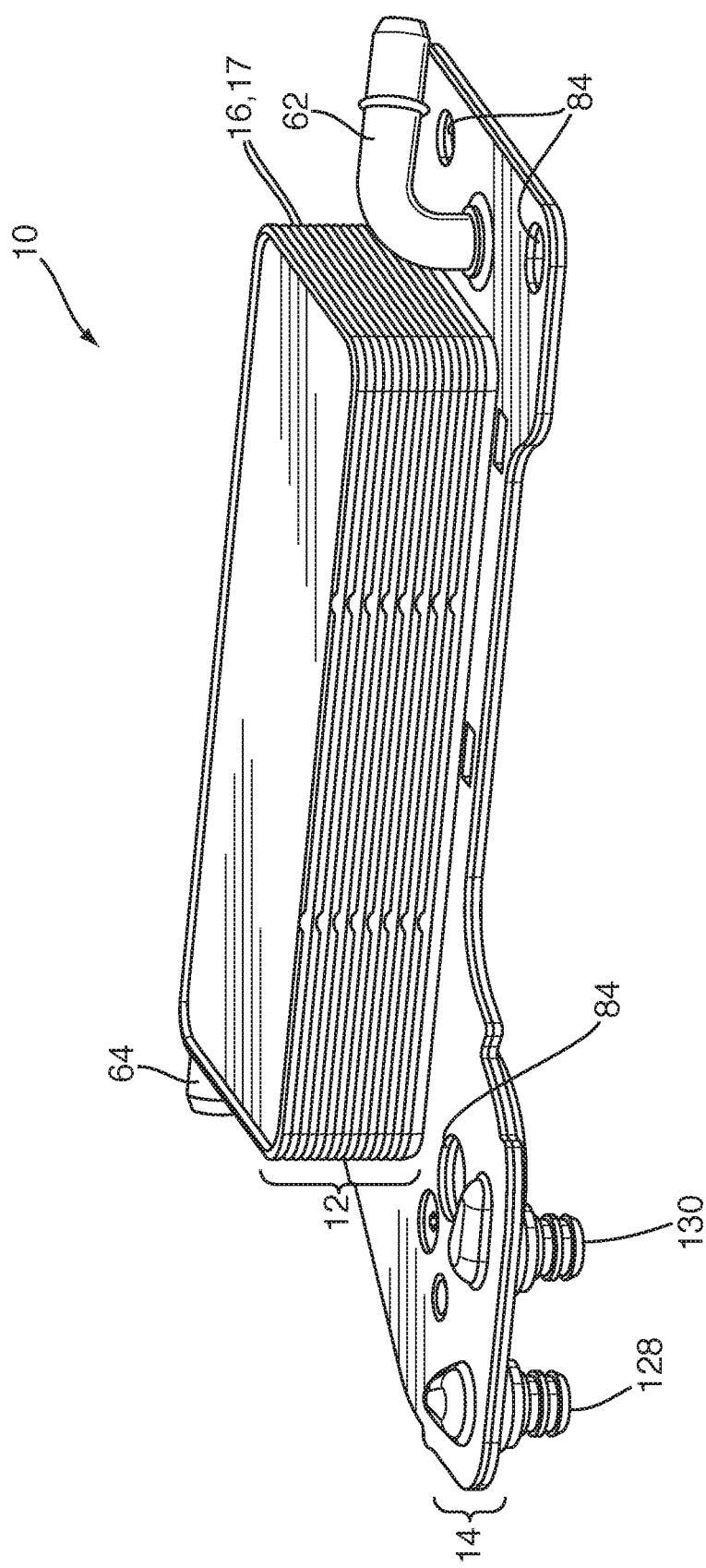
FIG. 1 is a perspective view of a heat exchanger module according to an exemplary embodiment of the present disclosure.

Referring now to FIG. 1, there is shown an exemplary embodiment of a heat exchanger module 10 in accordance with the present disclosure. Heat exchanger module 10 is comprised of a heat exchanger 12 fixedly attached directly to an adapter module 14. Heat exchanger 12 is generally in the form of a nested, dished-plate heat exchanger, as is known in the art, and is comprised of a plurality of stamped heat exchanger core plates 16, 17 disposed in alternatingly stacked relation to one another to form a heat exchanger core with alternating first and second fluid flow passages 20, 22 (not shown in FIG. 1) formed between the stacked core plates 16, 17. The first fluid flow passages 20 are for flow of a first heat transfer fluid, and the second fluid flow passages 22 are for flow of a second heat transfer fluid. In the present embodiment, the first heat transfer fluid (also referred to herein as the "first fluid" or "coolant") is engine coolant, which typically comprises glycol or a glycol/water mixture and the second heat transfer fluid (also referred to herein as the "second fluid" or "oil") is a transmission oil. In other embodiments, the second heat transfer fluid may be engine oil. It will be appreciated that the coolant may either absorb heat from the oil or transfer heat to the oil, depending on the temperature differential between the oil and coolant, which depends on the operating state of the motor vehicle.

In the present embodiment, the metal components of heat exchanger module 10 may be comprised of aluminum (including alloys thereof) and are joined together by brazing. For example, all the metal components of heat exchanger module 10 may be assembled and then heated to a brazing temperature in a brazing oven, whereby the metal components are brazed together in a single brazing operation, as is known in the art.

Figure 2:
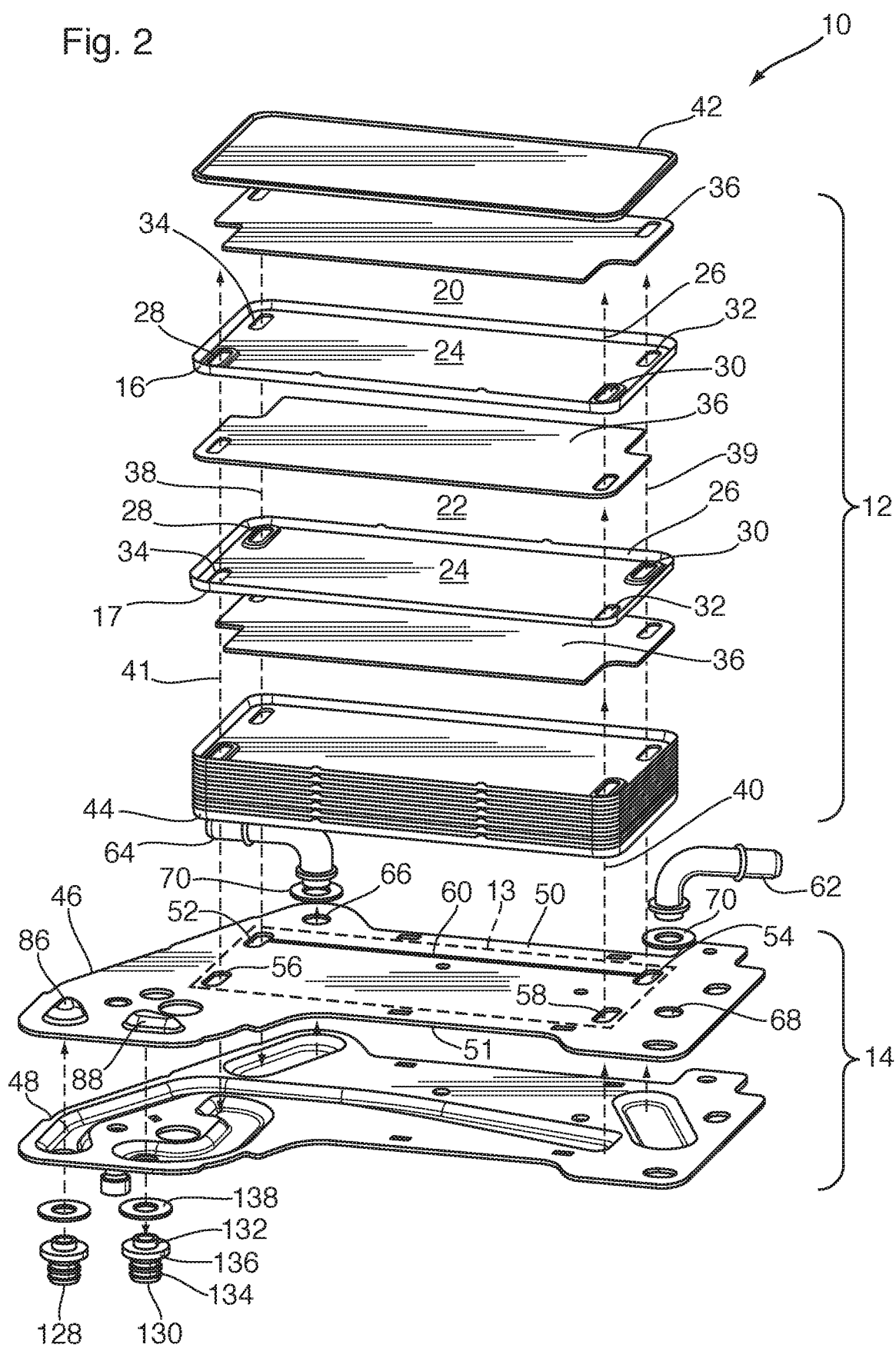
FIG. 2 is an exploded view of the heat exchanger module of FIG. 1.

Referring now to FIG. 2, an exploded view of the heat exchanger module 10 in FIG. 1 is shown. It can be seen from FIG. 2 that core plates 16, 17 may be identical to one another, with the alternating arrangement of core plates 16, 17 being provided by rotating every other core plate 16, 17 in the stack by 180 degrees (i.e. end-to-end), relative the adjacent core plates 16, 17 in the stack.

As illustrated in FIG. 2, the core plates 16, 17 each comprise a generally planar base portion 24 surrounded on all sides by a sloping edge wall 26. The core plates 16, 17 are stacked one on top of another with their edge walls 26 in nested, sealed engagement. Each core plate 16, 17 is provided with four holes 28, 30, 32, 34 near its four corners, each of which serves as an inlet hole or an outlet hole for the first or second heat transfer fluid as required by the particular application. Two holes 28, 30 are raised with respect to the base portion 24 of the core plate 16 while the other two holes 32, 34 are formed in and are co-planar with the base portion 24. The raised holes 28, 30 in one core plate 17 align with and seal against the flat or co-planar holes 32, 34 of the adjacent core plate 16 thereby spacing apart the core plates 16, 17 and defining the alternating first and second fluid passages 20, 22. Turbulizers 36 can be positioned between the core plates 16, 17 in each of the first and second fluid flow passages 20, 22 to improve heat transfer, as is known in the art. Alternatively, rather than having individual turbulizers 36 positioned in each of the fluid flow passages 20, 22, the core plates 16, 17 may themselves may be formed with heat transfer augmentation features, such as ribs and/or dimples formed in the planar base portion 24 of the core plates 16, 17, as is known in the art. The aligned sealing holes 28, 30, 32, 34 in the stacked core plates 16, 17 form a first inlet manifold 38 and first outlet manifold 39 coupled to one another by first fluid flow passages 20 for the flow of the first fluid through the heat exchanger 12; and a second inlet manifold 40 and a second outlet manifold 41 coupled to one another by second fluid flow passages 22 for the flow of the second fluid through the heat exchanger 12. It will be appreciated that the identities of the manifolds may be reversed, such that the manifold 38 is the first fluid outlet manifold, manifold 39 is the first fluid inlet manifold, manifold 40 is the second fluid outlet manifold, and manifold 41 is the second fluid inlet manifold. The flow directions of the first and second heat transfer fluids in fluid flow passages 20, 22 may either be the same ("co-flow") or opposite ("counter-flow").

Top and bottom plates 42, 44 (also referred to herein as "end plates") enclose the stack of core plates 16, 17 to form the heat exchanger 12. Together, the end plates 42, 44 close one end of each manifold 38, 39, 40, 41 and provide a conduit opening at the other end of the manifold 38, 39, 40, 41. The locations of the conduit openings in end plates 42, 44 will depend upon the requirements of each particular application, such that each end plate 42, 44 will have from zero to four conduit openings, with the total number of such conduit openings being four, i.e. one for each manifold 38, 39, 40, 41. In the example shown, top plate 42 does not have any conduit openings, to sealingly close off one end of each manifold 38, 39, 40, 41 of heat exchanger 12, while bottom plate 44 has four conduit openings 28, 30, 32, 34 (not shown) formed therein. Therefore, in the present embodiment, all the fluid connections to heat exchanger 12 are made through the bottom plate 44 thereof.

Top plate 42 and bottom plate 44 generally have the same shape and thickness as heat exchanger plates 16, 17, except that, in some embodiments, either or both may be slightly thicker than plates 16, 17 to enhance rigidity of the heat exchanger module 10. In the present embodiment, however, where the bottom plate 44 has the same number and configuration of openings 28, 30, 32 and 34 as each of the core plates 16, 17, the bottom plate 44 may be identical to each of the core plates 16, 17. On the other hand, the top plate 42 may be identical to each of the core plates 16, 17 in terms of shape and thickness, but does not include any openings. It can be seen that the heat exchanger 12 of module 10 is not mounted to a thickened, planar base plate, which reduces the overall height, weight and material cost of module 10.

Heat exchangers of the type described above are generally known in the art and, for instance, described in U.S. Pat. No. 7,717,164, the teachings of which are incorporated herein by reference. Furthermore, the above-described heat exchanger 12 has been described for illustrative purposes and it will be understood that any suitable heat exchanger, as known in the art, may be used in the heat exchanger module 10 of the present disclosure.

Referring now to FIGS. 2, 3A, 3B, 4A, and 4B, the adapter module 14 according to one exemplary embodiment of the present disclosure will now be described in further detail. In the subject embodiment, adapter module 14 is comprised of a first adapter plate 46 and a second adapter plate 48 which are sealingly joined together, for example by brazing.

Figure 3A:
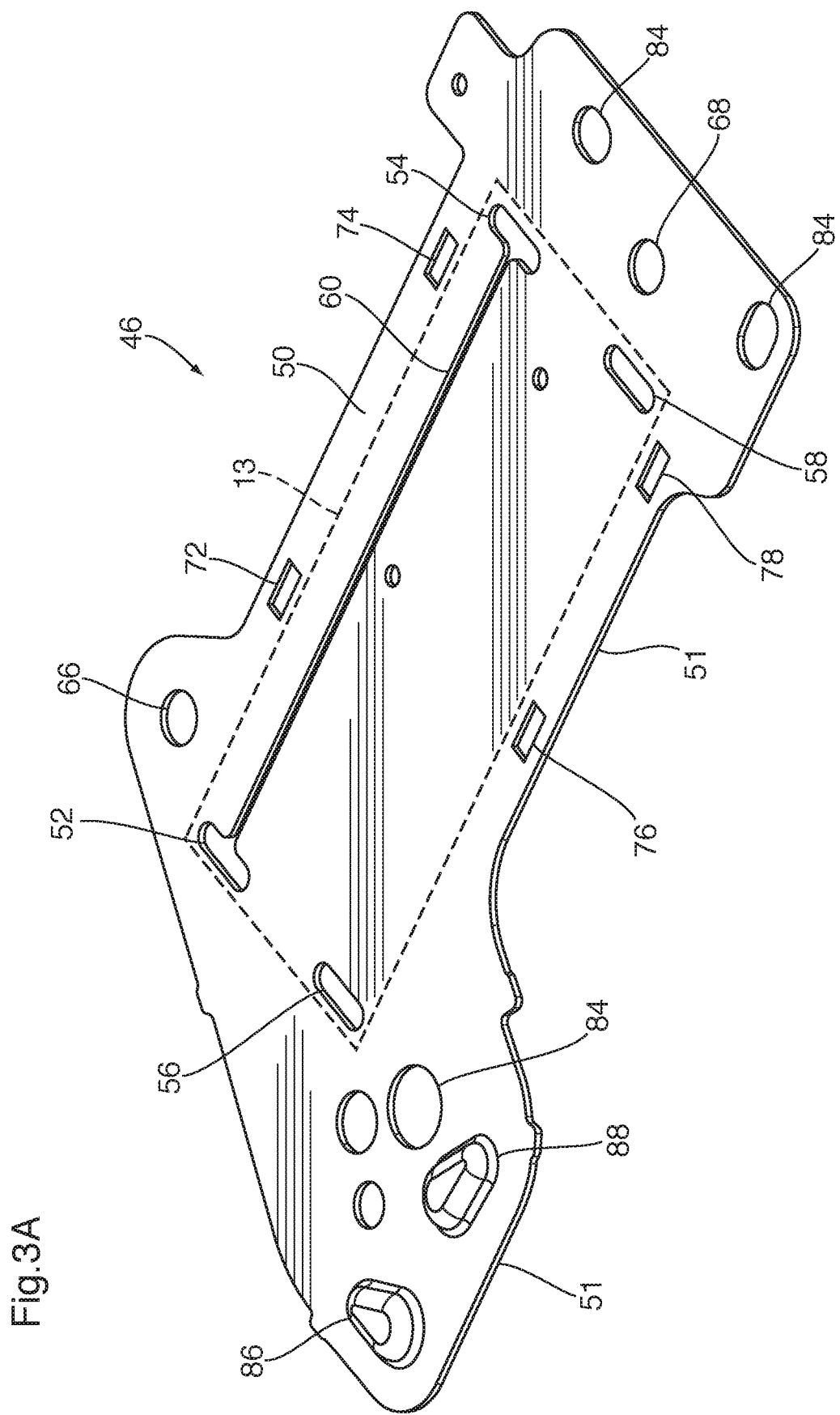
FIG. 3A is a perspective view of a first adapter plate that forms part of an adapter module of the heat exchange module as shown in FIG. 2.
Figure 3B:
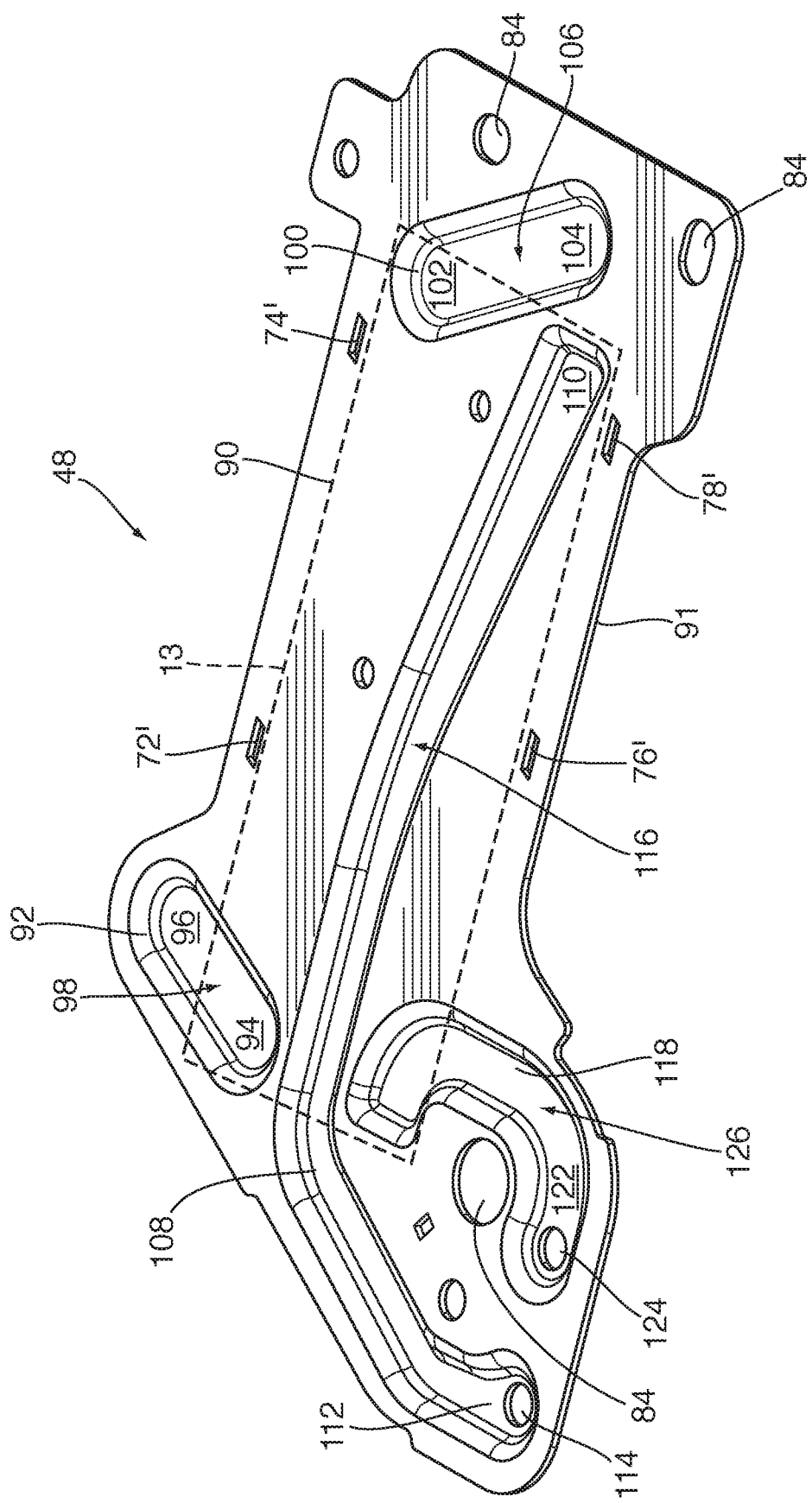
FIG. 3B is a perspective view of a second adapter plate that forms part of an adapter module of the heat exchange module as shown in FIG. 2.
Figure 4A:
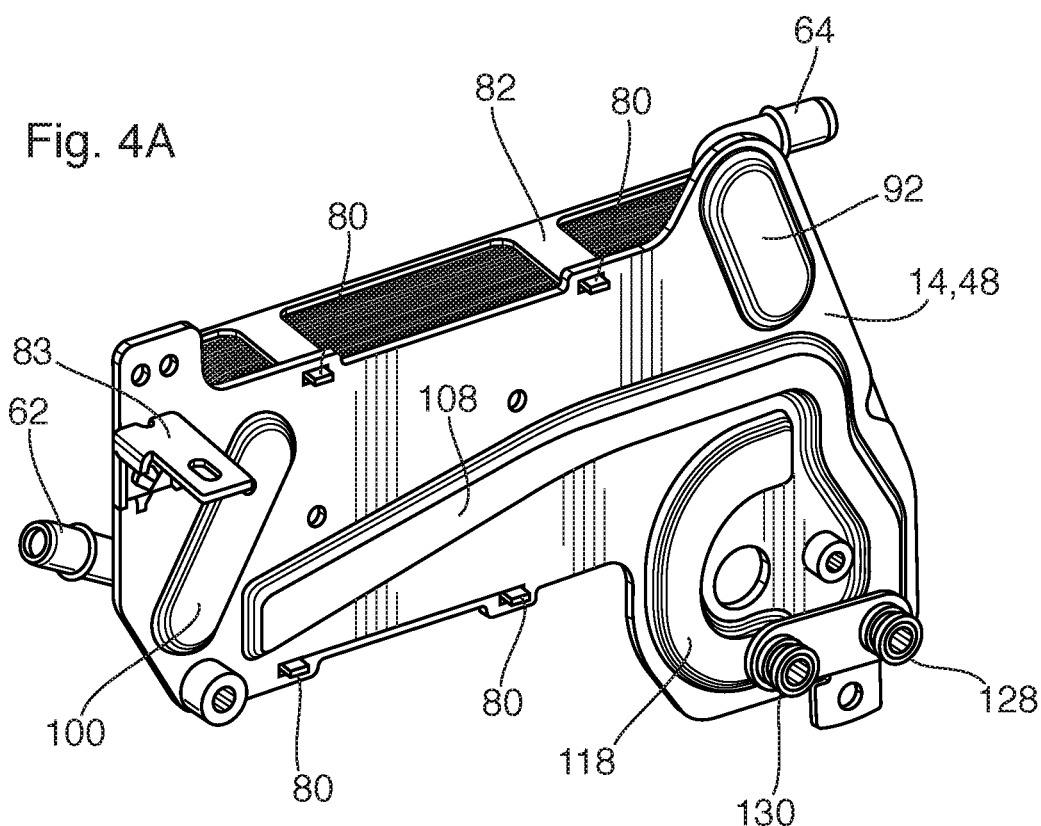
FIG. 4A is a perspective bottom view of the heat exchanger module of FIG. 1 with a protective shield.
Figure 4B:
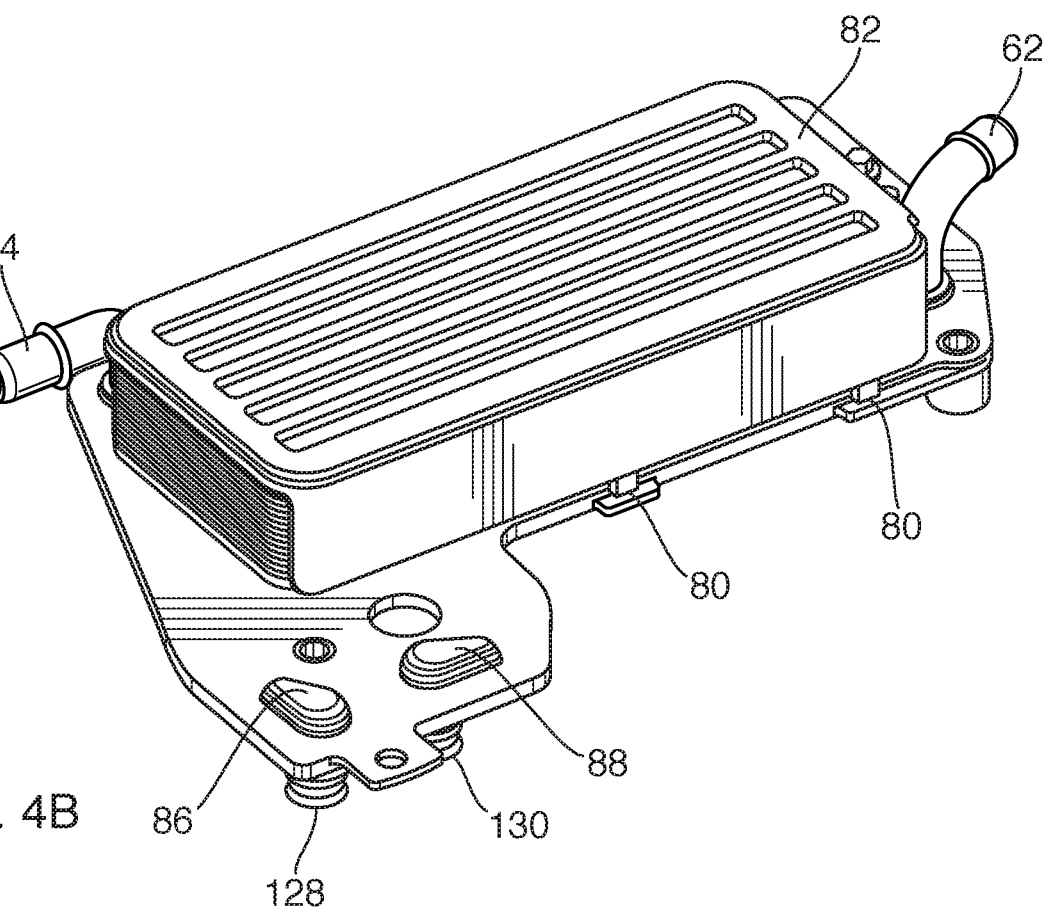
FIG. 4B is a perspective top view of the heat exchanger module with a protective shield in FIG. 4A.

The first adapter plate 46 as shown in FIG. 3A has a first (top) surface 50 and an opposite second (bottom) surface 51, wherein the first surface 50 may be brazed to one end, e.g. the bottom plate 44, of heat exchanger 12. As shown in the drawings, heat exchanger 12 has a "footprint" 13 corresponding to the area defined by the base portion 24 of the stacked core plates 16, 17 and bottom plate 44, the adapter module 14 being fixedly attached to the heat exchanger 12 within the footprint area 13 of the heat exchanger 12, for example by brazing. In the subject embodiment, the adapter module 14 has at least a portion that extends outwardly beyond the footprint 13 of the heat exchanger 12, as will be described in further detail below.

First adapter plate 46 defines fluid ports 52, 54, 56, 58, which are positioned within the footprint 13 of heat exchanger 12. The four fluid ports 52, 54, 56, 58 are in alignment with conduit openings 28, 30, 34, 32 of the bottom plate 44 such that fluid ports 52 and 54 are in fluid communication with the bottom ends of the first inlet and the outlet manifolds 38, 39 for the first fluid (coolant), while fluid ports 56 and 58 are in fluid communication with the bottom ends of the second inlet and outlet manifolds 41, 40 for the second fluid (oil). In some embodiments, such as the one shown in FIG. 3A, a slit opening 60 extends from fluid port 52 to fluid port 54. Together with base portion 24 of the bottom plate 44, and the top surface of the second adapter plate 48, a pressure relief channel 60 for the first fluid is formed. The function of the pressure relief channel 60 is discussed in more detail below.

The first adapter plate 46 further comprises conduit openings 66, 68 for receiving and forming a sealed connection with inlet/outlet fittings 64, 62 for the first fluid, which are configured as 90 degree elbow fittings. In the illustrated embodiment, brazing rings 70 comprised of brazing alloy may be used for forming a braze joint between the fittings 64, 62 and the conduit openings 66, 68 as it is known in the art. The fittings 62, 64 are configured for connection to hoses or tubes (not shown) in the vehicle's coolant circulation system. The provision of fittings 62, 64 on the adapter module 14 rather than on the top plate 42 reduces the overall height of the heat exchanger module 10.

In the present embodiment, connection openings 72, 74, 76, and 78 in the form of rectangular slots are formed on the first adapter plate 46, and corresponding, aligned slots 72', 74', 76' and 78' are formed on the second adapter plate 48, these slots being located just outside the footprint 13 of the heat exchanger 12, for receiving connection members 80 of a protective shield 82. The terminal ends of connection members 80 may be enlarged and/or provided with detents to provide an interference or friction fit within the connection openings 72, 74, 76, 78, 72', 74', 76', 78'. It is to be appreciated that any other suitable method of connection for attaching the protective shield 82 may be used. The shield 82 may be molded from plastic and is secured over heat exchanger 12 after the metal components of heat exchanger module 10 are brazed together. One or more openings 84 are formed in the adapter module 14, each for receiving a fastening device such as a screw or bolt (not shown) for mechanically securing the heat exchanger module 10 to the automobile system component housing, e.g. the transmission housing. One or more mounting brackets 83 (FIG. 4A) may also be provided on the underside of adapter module 14 for mounting to the component housing.

In some embodiments, including the one shown in FIGS. 2, 3A, 4B, and 5B, the first adapter plate 46 is substantially flat and planar except that, formed on the first surface 50 of the first adapter plate 46 are a first projection 86 and a second projection 88, both of which project upwardly from the first surface 50 and are discussed in more detail below.

The second adapter plate 48 has a first (top) surface 90 that may be brazed to the second surface 51 of the first adapter plate 46, and an opposite second (bottom) surface 91. Formed on the second surface 91 and projecting therefrom is a third trough portion 92, defined by a first end 94 and an opposite second end 96, wherein the first end 94 of third trough portion 92 is inside the footprint 13 of heat exchanger 12, while the second end 96 is outside the footprint 13. The third trough portion 92 may be in the form of a straight, embossed rib. The second end 96 of third trough portion 92 is aligned with conduit opening 66, such that inlet fitting 64 extends through conduit opening 66, partially into the third trough portion 92 at the second end 96, which is outside the footprint 13 of the heat exchanger 12. The first end 94 is aligned with fluid port 52 of the first adapter plate 46 such that, when the two adapter plates 46 and 48 are brazed together, a fluid transfer channel 98 is formed between the adapter plates 46, 48 to permit flow of the first fluid (coolant) between the inlet fitting 64 and the first fluid inlet manifold 38 through fluid port 52 as best shown by the dotted lines in FIG. 2.

Also formed on the second surface 91 of second adapter plate 48 and projecting therefrom is a fourth trough portion 100, defined by a first end 102 and an opposite second end 104, wherein the first end 102 of fourth trough portion 100 is inside the footprint 13 of heat exchanger 12, while the second end 104 is outside the footprint 13. The fourth trough portion 100 may be in the form of a straight, embossed rib. The second end 104 of fourth trough portion 100 is aligned with conduit opening 68, such that outlet fitting 62 extends through conduit opening 68, partially into the fourth trough portion 100 at the second end 104, which is located outside the footprint 13 of the heat exchanger 12. The first end 102 is aligned with fluid port 54 of the first adapter plate 46 such that, when the two adapter plates 46 and 48 are brazed together, a fluid transfer channel 106 is formed between the adapter plates 46, 48 to permit flow of the first fluid (coolant) between the first outlet manifold 39 and the outlet fitting 62 through fluid port 54 as best shown by the dotted lines in FIG. 2.

As mentioned above, a slit opening 60 extends from fluid port 52 to fluid port 54. Together with base portion 24 of the end plate 44, and the top surface 90 of the second adapter plate 48, a pressure relief channel is formed by slit opening 60, to permit fluid movement between first inlet and outlet manifolds 38, 39 through fluid transfer channels 98 and 106 while bypassing the first fluid flow passages 20 of the heat exchanger 12. This may alleviate excessive fluid pressure in the heat exchanger 12, thereby facilitating fluid movement in the heat exchanger 12, which may result in more efficient heat exchange operation.

A first trough portion 108 is formed on the second surface 91 of second adapter plate 48 and projects therefrom. The first trough portion 108 is defined by a first end 110 and an opposite second end 112, wherein the first end 110 of first trough portion 108 is inside the footprint 13 of heat exchanger 12, while the second end 112 is outside the footprint 13. The first trough portion 108 may be in the form of an embossed, elongate, curved rib. The first end 110 is aligned with fluid port 58 of the first adapter plate 46 such that, when the two plates 46 and 48 are brazed together, the first end 110 of third trough portion 108 is in fluid communication with the manifold 40, identified herein as the second fluid (oil) inlet manifold. Trough portion 108 has a second fluid inlet port 114 (identified herein as second fluid inlet port) formed at the second end 112, which is outside the footprint 13 of the heat exchanger 12. When the two adapter plates 46 and 48 are brazed together, trough portion 108 and corresponding portions of the first adapter plate 46 form a fluid transfer channel 116 between the adapter plates 46, 48, to permit flow of the second fluid (oil) from the second fluid inlet port 114 to the second inlet manifold 40 through fluid port 58 as best shown by the dotted lines in FIG. 2.

A second trough portion 118 is formed on the second surface 91 of second adapter plate 48 and projects therefrom. The second trough portion 118 is defined by a first end 120 and an opposite second end 122 opposite to the first end 120, wherein the first end 120 of second trough portion 118 is inside the footprint 13 of heat exchanger 12, while the second end 122 is outside the footprint 13. The second trough portion 118 may be in the form of an embossed, elongate, curved rib. The first end 120 is aligned with fluid port 56 of the first adapter plate 46 such that, when the two plates 46 and 48 are brazed together, the first end 120 of second trough portion 118 is in fluid communication with the manifold 41, identified herein as the second fluid (oil) outlet manifold. Trough portion 118 has a second fluid port 124 (identified herein as second fluid outlet port) formed at the second end 112, which is outside the footprint 13 of heat exchanger 12. When the two adapter plates 46 and 48 are brazed together, trough portion 118 and corresponding portions of the first adapter plate 46 form a fluid transfer channel 126 between the adapter plates 46, 48, to permit flow of the second fluid (oil) from the second fluid outlet manifold 41, through fluid port 56, to the second fluid outlet port 124 as best shown by the dotted lines in FIG. 2.

Figure 5A:
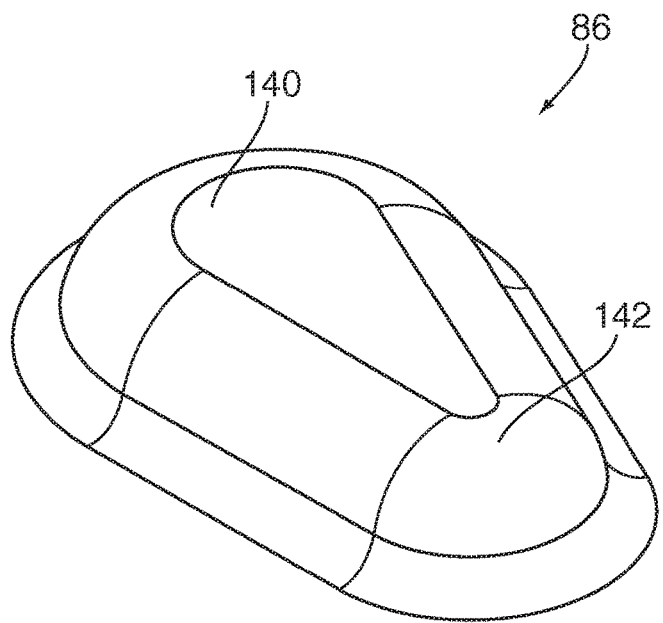
FIG. 5A is a perspective view of an embossment on the first adapter plate of the heat exchanger module shown in FIG. 1.
Figure 5B:
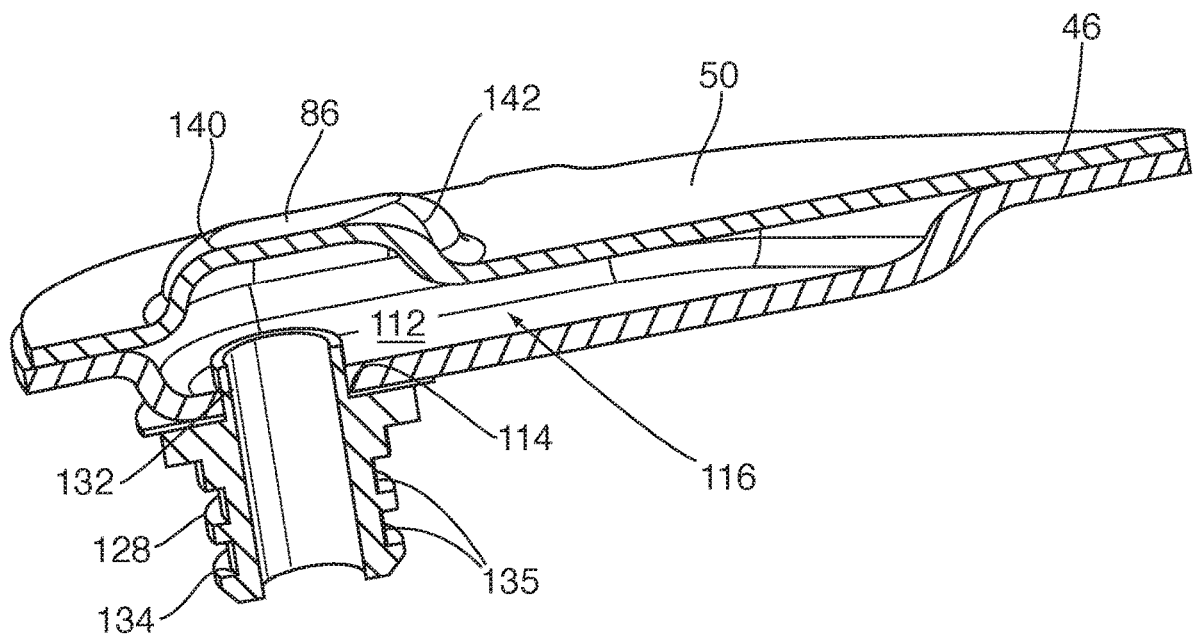
FIG. 5B is a partial cross-sectional view of parts of the adapter plate shown in FIG. 1 showing a fluid transfer channel, the embossment of FIG. 5A, and a plug-in fitting.

Fluid ports 114 and 124 are configured to each receive inlet and outlet fittings 128 and 130 respectively. These fittings 128, 130 are sometimes referred to herein as "plug-in" fittings because they are adapted to be sealingly received inside oil ports of a transmission housing (not shown). Accordingly, as best seen in FIG. 5B, each plug-in fitting 128, 130 includes a tubular body that is divided into a first section 132 and a second section 134 by a flange 136 on its exterior surface. The first portion 132 of plug-in fitting 128 extends partially into first trough portion 108 through fluid port 114. Similarly, the first portion 132 of plug-in fitting 130 extends partially into second trough portion 118 through fluid port 124. When assembled, the flange 136 of each fitting 128, 130 abuts a flat bottom surface of a trough portion 108, 118 surrounding a fluid opening 114, 124. As with coolant fittings 62, 64, brazing rings 138 comprised of brazing alloy may be used for forming braze joints between the plug-in fittings 128, 130 and the second surface 91 of the second adapter plate 48 as known in the art.

The second portion 134 of each plug-in fitting is configured with one or more annular grooves 135 on its exterior surface. The annular grooves 135 are adapted to receive resilient sealing elements such as O-rings (not shown), in order to form a seal against the inner surface of an oil port of a vehicle component such as an engine or transmission housing (not shown). Thus, the plug-in fittings 128 and 130 enable the heat exchanger module 10 to be readily and directly mounted onto a vehicle component without the need for additional fluid connections and conduits.

In use, the second heat transfer fluid (oil) may flow from the oil outlet port of a vehicle component on which a heat exchanger module 10 is installed into the adapter module 14 through plug-in fitting 128. From there, the oil flows through fluid transfer channel 116 (first trough portion 108) from second end 112 to first end 110 and enters second fluid inlet manifold 40 through fluid port 58, to be distributed via second fluid inlet manifold 40 through second fluid flow passages 22 to second fluid outlet manifold 41. From there, the oil then flows into fluid transfer channel 126 (second trough portion 118) through fluid port 56, flows from the first end 120 to the second end 122, and exits the adapter module 14 into the oil inlet port of the vehicle component through plug-in fitting 130.

In use, the adapter module 14 may receive the first heat transfer fluid (coolant) through coolant inlet fitting 64 and opening 66 from the coolant circulation system of the vehicle. From there, the coolant flows through fluid transfer channel 98 (third trough portion 92) from second end 96 to first end 94 and enters first fluid inlet manifold 38 through fluid port 52, to be distributed via first fluid inlet manifold 38 through first fluid flow passages 20 to first fluid outlet manifold 39. From there, the coolant then flows into fluid transfer channel 106 (fourth trough portion 100) through fluid port 54, flows from the first end 102 to the second end 104, and exits the adapter module 14 through opening 68 and coolant outlet fitting 62, to be returned to the coolant circulation system.

When the coolant entering the first fluid flow passages 20 of heat exchanger 12 is at a lower temperature than the oil entering the second fluid flow passages 22, the coolant will absorb heat from the oil, thereby cooling the oil. Under these conditions the heat exchanger functions as an oil cooler. Oil cooling is normally performed once the vehicle engine and transmission have reached their normal operating temperatures. The coolant for cooling the oil may be taken from the coolant circulation system downstream of another heat exchanger, such as a radiator where the coolant is cooled by ambient air.

When the coolant entering the first fluid flow passages 20 of heat exchanger 12 is at a higher temperature than the oil entering the second fluid flow passages 22, the coolant will transfer heat to the oil, thereby heating the oil. Under these conditions the heat exchanger 12 functions as an oil heater. Oil heating is normally performed before the vehicle engine and transmission have reached their normal operating temperatures, such as under cold start conditions. The coolant for heating the oil may be taken from the coolant circulation system downstream of the internal combustion engine. A thermally actuated valve (not shown) may be located in the coolant circulation system, upstream of the heat exchanger module 10, to control the source of the coolant being circulated to the heat exchanger module 10.

It is to be appreciated that although certain configurations of the fluid ports and adapter module shape are described, the shape of the adapter module 14 may be configured to accommodate the external shape of the vehicle component. Furthermore, it is to be appreciated that at least the trough portions 108 and 118 may be configured so that fluid ports 114 and 124 are located to correspond to the fluid inlet/outlet from the vehicle component. It is to be appreciated by a skilled person in the art that other types of suitable fittings that permits sealing connection between the adapter module and the vehicle system component are contemplated.

In the illustrated embodiment, fluid ports 114 and 124 of the second adapter plate 48 are positioned beneath the first and second projections 86, 88 of the first adapter plate 46, respectively. FIG. 5A shows one embodiment of the projection 86, shown in isolation. It is understood that projection 88 is of the same or similar configuration. As shown, the first projection 86 is configured as a lachrymiform or teardrop shape having a spherically rounded head portion 140 and a frustum tail portion 142. As shown in FIG. 5B, when plug-in fitting 128 is received in fluid port 114, the opening of the plug-in fitting 128 is positioned directly below the rounded head portion 140 of projection 86, while the frustum tail portion 142 of projection 86 is pointed along the direction of fluid transfer channel 116. Similarly, plug-in fitting 130, when received by fluid port 124, has its opening positioned directly beneath rounded head portion 140 of the second projection 88, while the frustum tail portion 142 of projection 88 is pointed along the direction of fluid transfer channel 126. Thus, projections 86, 88 create enlarged portions of fluid transfer channels 116 and 126, respectively. Advantageously, the enlarged portion of the fluid transfer channel 116, 126 offers less flow resistance to the second fluid (oil) entering and/or leaving the heat exchanger module 10 through openings 114, 124 and fittings 128, 130, thereby reducing pressure drop in the flow of the second fluid through the heat exchanger module 10. The frustum tail portion 142 of each projection 86, 88, being pointed in the general direction of the fluid transfer channel 116 or 126, helps to guide the fluid in a desired direction and further may further improve fluid flow. It is to be appreciated that although flat-bottomed lachrymiform or teardrop shapes for the projections 86, 88 are described above, other shapes, such as semi-spherical and ovoid, may also be suitable. Also, the projections 86, 88 may be elongated so as to follow along the portions of the first and second trough portions 108, 118 located outside the footprint 13 of the heat exchanger 12.

Figure 6B:
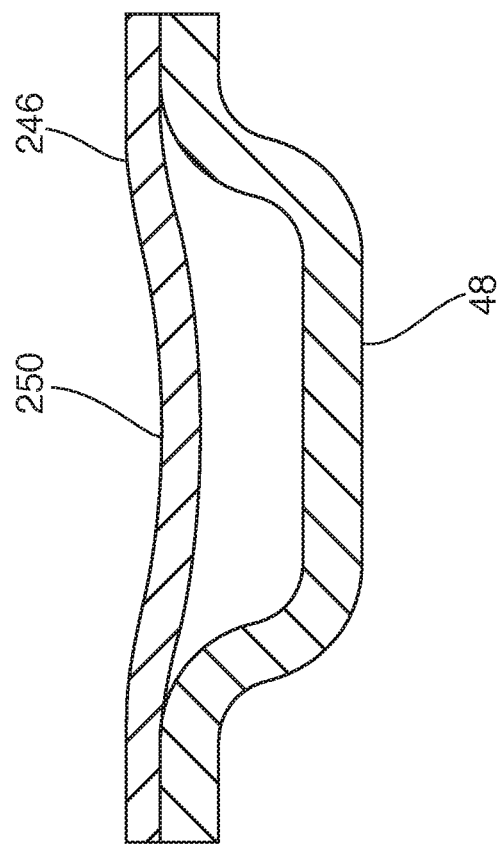
FIG. 6B is an elevation cross-sectional view of a fluid transfer channel of the adapter module of another embodiment of the heat exchanger module where corresponding portions of the first adapter plate that forms part of the fluid transfer channel is configured as an inverted arch.
Figure 6A:
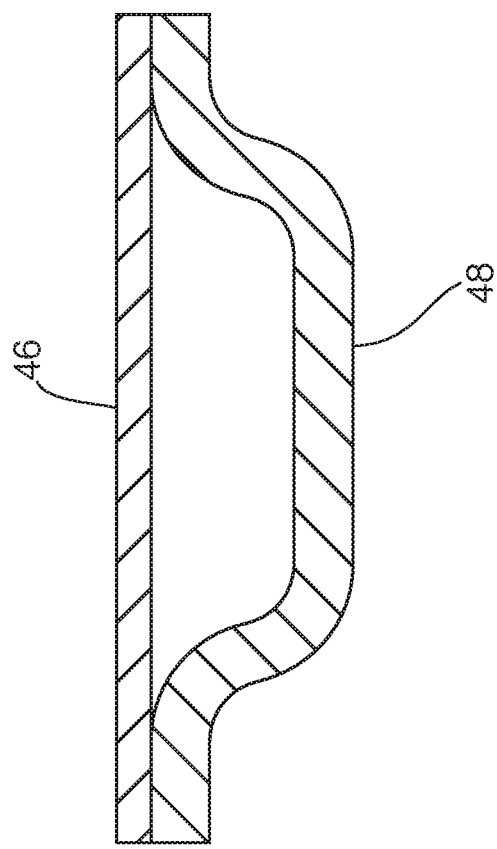
FIG. 6A is an elevation cross-sectional view of a fluid transfer channel of the adapter module where corresponding portions of the first adapter plate that forms part of the fluid transfer channel is flat.

As may be appreciated by those skilled in the art, the first and second fluids inside the fluid transfer channels 98, 106, 116, and 126 could exert considerable pressure on the portions of the first and second adapter plates 46, 48 that form such channels. In some embodiments, a least some portions of the first adapter plate 46 that form a part of the fluid transfer channels 98, 106, 116, and 126 (portions that are positioned directly above trough portions 92, 100, 108, and 118) are configured as flat plate portions, as best shown in FIG. 6A. In some further embodiments, at least some portions of the first adapter plate 46 that form part of one or more of the fluid transfer channels 98, 106, 116, and 126 (portions that are positioned directly above trough portions 92, 100, 108, and 118) are configured in the form of an inverted arch 250 as shown in FIG. 6B. Advantageously, the inverted arch 250 may be able to withstand higher fluid pressure within the fluid transfer channels 98, 106, 116, 126. Each inverted arch 250 is shallower than any of the trough portions 92, 100, 108. Also, each inverted arch 250 projects from the second surface 51 of the first adapter plate 46, in a direction opposite to the projections 86, 88, and has a shallower depth than projections 86, 88.

To simplify the manufacture of heat exchange module 110, the trough portions 92, 100, 108, 118; projections 86, 88; and inverted arches 250 may be integrally formed with the first and second adapter plates 46, 48, and may comprise embossments which are formed in the plates by stamping. For example, the embossments comprising trough portions 92, 100, 108, 118 and projections 86, 88 may be formed by deep drawing of the first and second adapter plates 46, 48.

Each of the trough portions 92, 100, 108, 118 and each of the projections 86, 88 is in the form of a flat-bottomed rib, although other profiles are possible, such as round-bottomed. In addition to performing a fluid transfer function, each of the trough portions 92, 100, 108, 118 functions as a strengthening rib which enhances the rigidity of the second adapter plate 48. Similarly, where projections 86, 88 are provided, they act as strengthening ribs to enhance the rigidity of the first adapter plate 46. When the first and second adapter plates 46, 48 are brazed together to form adapter module 14, the presence of trough portions 92, 100, 108, 118 enhances the rigidity of the adapter module 14, and if projections 86, 88 are provided in first adapter plate 46, they will further enhance the rigidity of adapter module 14.

In particular, it can be seen that the first trough portion 108 includes a longitudinally extending portion (including end 110) which extends along the length of second adapter plate 48 and adapter module 14, thereby forming a longitudinal structural rib which traverses a major portion of the length of the second adapter plate 48 and adapter module 14. The first trough portion 108 also includes a transversely extending portion (including end 112) which extends along the width of the second adapter plate 48 and adapter module 14. The transversely extending portion of first trough portion 108 and the third trough portion 92 together extend across substantially the entire width of the second adapter plate 48 and adapter module 14. The fourth and second trough portions 100 and 118 have transverse and longitudinal components, and provide reinforcement along both the length and width dimensions of the second adapter plate 48 and adapter module 14.

Due to the enhanced rigidity provided by the trough portions 92, 100, 108, 118 and projections 86, 88 (where provided), the adapter module 14 according to the present embodiment is constructed from a pair of laminated plates 46, 48 rather than being constructed from a relatively thick and complex adapter module structure, which may comprise a cast or molded structure, or a lamination of metal plates, including a relatively thick plate provided with machined channels. Being constructed of relatively thin adapter plates 46, 48, the adapter module 14 may be directly brazed to the bottom plate 44 of the heat exchanger 12, avoiding the need for mechanical attachment of the heat exchanger 12 to the adapter module 14, and entirely avoiding the need to provide the heat exchanger 12 with a thick base plate.

It can be seen that the above-described construction of heat exchanger module 10 provide a number of benefits, such as reduction in size and weight, reduction in number of components, improved manufacturability, reduction in number of leak paths, and optionally reduced pressure drop.

It is to be understood by those skilled in the art that while a particular example of fluid circulation direction is described herein, it is not intended to be limiting and that variations depending upon the particular structure of the heat exchanger and/or the associated automobile system component may result in a different fluid pattern/circuit through the heat exchanger module 10.

What is claimed is:

1. A heat exchanger module for mounting directly to the outer surface of a housing of an automobile system component, the heat exchanger module comprising:
    a heat exchanger comprising a plurality of stacked heat exchange plates defining alternating first and second fluid flow passages through said heat exchanger, the heat exchanger having a footprint corresponding to an area defined by the stack of heat exchange plates;
    a pair of first fluid manifolds extending through the heat exchanger and coupled to one another by the first fluid flow passages, the pair of first fluid manifolds comprising an inlet manifold and an outlet manifold for the flow of a first fluid through said heat exchanger;
    a pair of second fluid manifolds extending through the heat exchanger and coupled to one another by the second fluid flow passages, the pair of second fluid manifolds comprising an inlet manifold and an outlet manifold for the flow of a second fluid through said heat exchanger;
    an adapter module having a first surface and an opposite second surface, wherein the first surface of the adapter module is attached to an end of the heat exchanger within the footprint of the heat exchanger, and wherein the second surface is adapted for direct face-to-face contact with an interface surface on the outer surface of the automobile system component housing, and wherein the adapter module has a length and a width and includes a portion that extends outwardly beyond the footprint of the heat exchanger;
    the adapter module comprising:
        a second fluid inlet port on the second surface of the adapter module and outside the footprint of the heat exchanger, the second fluid inlet port being adapted for receiving the second fluid from an outlet port of the automobile system component housing;
        a second fluid outlet port on the second surface of the adapter module and outside the footprint of the heat exchanger, the second fluid outlet port being adapted for discharging the second fluid to an inlet port of the automobile system component housing;
        a first fluid transfer channel formed in the adapter module for allowing fluid communication between a first one of the second fluid manifolds and the second fluid inlet port or the second fluid outlet port;
    wherein the adapter module further comprises:
        a first adapter plate having a first surface and an opposed second surface, the first surface of the first adapter plate defining the first surface of the adapter module, and through which the adapter module is attached to the end of the heat exchanger; and
        a second adapter plate having a first surface and a second surface, the first surface of the second adapter plate fixedly attached to the second surface of the first adapter plate, and the second surface of the second adapter plate defining said second surface of said adapter module;
    wherein the first fluid transfer channel is formed between the first and second adapter plates;
    wherein the first fluid transfer channel comprises a first trough portion which projects from the second surface of the second adapter plate;
    wherein the first trough portion is elongate, and extends along at least a portion of the length of the adapter module and/or along at least a portion of the width of the adapter module; and
    wherein the first trough portion has a first end and a second end, the first trough portion extending continuously between the first and second ends thereof, the first end being within the footprint of the heat exchanger and aligned with a first fluid port formed on the first adapter plate, the first fluid port being aligned with said one of the second fluid manifolds, and wherein the second end of the first trough portion is outside the footprint of the heat exchanger and aligned with said second fluid inlet or outlet port.

2. The heat exchanger module of claim 1, wherein the first trough portion comprises an embossed rib and is integral with the second adapter plate.

3. The heat exchanger module of claim 1, wherein the plurality of stacked heat exchange plates comprises a plurality of core plates, a top plate, and a bottom plate, wherein the bottom plate has a bottom surface which defines the end of the heat exchanger to which the first surface of the adapter module is attached.

4. The heat exchanger of claim 3, wherein the core plates are identical to one another, and wherein the bottom plate has at least the same shape and thickness as the core plates.

5. The heat exchanger of claim 3, wherein the bottom plate and each of the core plates has four conduit openings, and wherein the bottom plate and the core plates are identical to each other.

6. The heat exchanger of claim 1, further comprising a second fluid transfer channel formed in the adapter module for allowing fluid communication between a second one of the second fluid manifolds and the other one of the second fluid inlet port and the second fluid outlet port;
    wherein the second fluid transfer channel is formed between the first and second adapter plates;
    wherein the second fluid transfer channel comprises a second trough portion which projects from the second surface of the second adapter plate;
    wherein the second trough portion comprising the second fluid transfer channel is elongate, and extends along at least a portion of the length of the adapter module and/or at least a portion of the width of the adapter module; and
    wherein the second trough portion comprises a second embossed rib and has a first end and a second end, the second trough portion extending continuously between the first and second ends thereof, the first end being within the footprint of the heat exchanger and aligned with a second fluid port formed on the first adapter plate, the second fluid port being aligned with another of the second fluid manifolds, and the second end being outside the footprint of the heat exchanger and aligned with said second fluid inlet or outlet port.

7. The heat exchanger module of claim 6, further comprising:
a third trough portion formed in the second adapter plate, the third trough portion having a first end and a second end, the third trough portion extending continuously between the first and second ends thereof, the first end being within the footprint of the heat exchanger and aligned with a first fluid inlet port formed on the first adapter plate, and the second end being outside the footprint of the heat exchanger and aligned with the first fluid inlet manifold of the heat exchanger, wherein the third trough portion projects from the second surface of the second adapter plate, wherein the third trough portion extends along at least a portion of the length of the adapter module and/or at least a portion of the width of the adapter module, and wherein the third trough portion comprises a third embossed rib;
a fourth trough portion formed in the second adapter plate, the fourth trough portion having a first end and a second end, the fourth trough portion extending continuously between the first and second ends thereof, the first end being within the footprint of the heat exchanger and aligned with a first fluid outlet port formed on the first adapter plate, and the second end being outside the footprint of the heat exchanger and aligned with the first fluid outlet manifold of the heat exchanger, wherein the fourth trough portion projects from the second surface of the second adapter plate, wherein the fourth trough portion extends along at least a portion of the length of the adapter module and/or at least a portion of the width of the adapter module, and wherein the fourth trough portion comprises a fourth embossed rib.

8. The heat exchanger module of claim 6, wherein the first adapter plate further comprises:
third and fourth fluid ports, each of which is in fluid communication with a bottom end of one of the first fluid manifolds of the heat exchanger; and
a slit opening in the first adapter plate, extending between the third and fourth fluid ports, such that fluid communication is provided between the third and fourth fluid ports through the slit opening.

9. The heat exchanger module of claim 8, wherein the slit opening defines a pressure relief channel for the first fluid, together with a bottom surface of a bottom plate of the heat exchanger, and the first surface of the second adapter plate.

10. The heat exchanger module of claim 1, further comprising:
a first projection formed on the first adapter plate, wherein the first projection is positioned over the second fluid inlet or outlet port.

11. The heat exchanger module of claim 10, wherein the first projection projects from the first surface of the first adapter plate, and is located in an area of the first adapter plate which is outside the footprint of the heat exchanger; wherein the first projection comprises an embossed rib.

12. The heat exchanger module of claim 10, wherein the first projection has a lachrymiform shape, with a spherically rounded head portion and a frustum tail portion; and
wherein the spherically rounded head portion of the first projection is positioned over an end of the first trough portion and over the second fluid inlet or outlet port, and the frustum tail portion of the first projection points in a direction toward an opposite end of the first trough portion.

13. The heat exchanger module of claim 10, wherein the first projection is positioned over the second fluid inlet port, wherein the first fluid transfer channel allows fluid communication between the first one of the second fluid manifolds and the second fluid inlet port;
and wherein the heat exchanger module further comprises:
a second fluid transfer channel formed in the adapter module for allowing fluid communication between a second one of the second fluid manifolds and the second fluid outlet port, wherein the second fluid transfer channel is formed between the first and second adapter plates, wherein the second fluid transfer channel comprises a second trough portion which projects from the second surface of the second adapter plate, wherein the second trough portion comprising the second fluid transfer channel is elongate, and extends along at least a portion of the length of the adapter module and/or at least a portion of the width of the adapter module;
and wherein the second trough portion comprises a second embossed rib; and
a second projection formed on the first adapter plate, wherein the second projection is positioned over the second trough portion and the second fluid outlet port, wherein the second projection projects from the first surface of the first adapter plate, and is located in an area of the first adapter plate which is outside the footprint of the heat exchanger, and wherein the second projection comprises an embossed rib.

14. The heat exchanger module of claim 13, wherein the second projection has a lachrymiform shape, with a spherically rounded head portion and a frustum tail portion; and
wherein the spherically rounded head portion of the second projection is positioned over an end of the second trough portion and over the second outlet port, and the frustum tail portion of the second projection points in a direction toward an opposite end of the first trough portion.

15. The heat exchanger module of claim 1, wherein an area of the first adapter plate which is positioned directly above the first trough portion and which partly defines the first fluid transfer channel is configured as an inverted arch.

16. The heat exchanger module of claim 15, wherein the inverted arch projects from the second surface of the first adapter plate and into the first fluid transfer channel.

17. The heat exchanger module of claim 1, further comprising:
a plurality of openings formed on the perimeter of the adapter module; and
a protective shield mounted onto the heat exchanger where a plurality of connection members of the protective shield engage the plurality of openings.

18. The heat exchanger module of claim 1, wherein each of the second fluid inlet port and the second fluid outlet port is provided with a plug-in fitting which is adapted to be sealingly received inside an inlet port or an outlet port of the automobile system component housing.

19. The heat exchanger module of claim 1, wherein the automobile system component is a transmission, wherein the first fluid is engine coolant, and wherein the second fluid is transmission oil.

* * * * *